United States Patent [19]

Wesemeyer et al.

[11] 4,180,803
[45] Dec. 25, 1979

[54] REMOTE CONTROL SYSTEM WITH PULSE ADDRESSING, AND SAFETY WARNING INDICATION

[75] Inventors: Jürgen Wesemeyer, Nuremberg; Georg Haubner, Berg, both of Fed. Rep. of Germany

[73] Assignee: Robert Bosch GmbH, Stuttgart, Fed. Rep. of Germany

[21] Appl. No.: 840,487

[22] Filed: Oct. 7, 1977

[30] Foreign Application Priority Data

Oct. 22, 1976 [DE] Fed. Rep. of Germany ....... 2647823

[51] Int. Cl.² .......................................... H04Q 11/04
[52] U.S. Cl. ................ 340/164 R; 340/168 R; 340/512; 340/310 R
[58] Field of Search ............... 340/168 R, 512, 163, 340/164 R, 52 R, 310 R

[56] References Cited

U.S. PATENT DOCUMENTS

| | | | |
|---|---|---|---|
| 3,293,605 | 12/1966 | Moore | 340/512 |
| 3,426,348 | 2/1969 | Sadler | 340/512 |
| 3,573,815 | 4/1971 | Leijten | 340/512 |
| 3,697,984 | 10/1972 | Atkinson | 340/512 |
| 4,085,403 | 4/1978 | Meier | 340/168 R |

*Primary Examiner*—Harold I. Pitts
*Attorney, Agent, or Firm*—Frishauf, Holtz, Goodman & Woodward

[57] ABSTRACT

A plurality of selectively switchable loads can be addressed from a central station over a ring bus system which has at least a clock bus and a control bus. The central station includes a timing counter which sends signals, for example in groups of pulses, on selected buses forming selection cycles to address specific loads and control signals to separate sequential selection cycles. These signals can be decoded at the receivers. To ensure operator supervision of proper operation of the system, a pulse interrogation stage is connected to at least the clock bus of the bus system and responsive to the occurrence of pulses thereon, and providing an alarm output or warning signal, possibly operating a warning device if the pulses do not occur as they should.

10 Claims, 2 Drawing Figures

REMOTE CONTROL SYSTEM WITH PULSE ADDRESSING, AND SAFETY WARNING INDICATION

REFERENCE TO RELATED APPLICATIONS

U.S. Ser. No. 648,783, filed Jan. 13, 1976, MEIER et al, now U.S. Pat. No. 4,085,403.
U.S. Ser. No. 835,180, filed Sept. 20, 1977.
U.S. Ser. No. 836,979, filed Sept. 26, 1977.

BACKGROUND OF THE INVENTION

The present invention relates to a remote control system for selective load switching, and more particularly to an automatic warning or supervisory system which provides for operator supervision of proper operation of the system.

U.S. patent application Ser. No. 648,783, filed Jan. 13, 1976, Werner MEIER, now U.S. Pat. No. 4,085,403, assigned to the assignee of the present application, discloses a system in which a central station is provided from which loads can be selectively addressed. The central station and a plurality of loads are all connected to a bus system which includes a clock bus line, a power bus, a control bus, and a feedback or reply bus on which signals appear acknowledging that a certain command is acknowledged and has been executed. A cyclically operated counter is connected to the clock bus to provide cyclical counts. Switching or addressing pulses, corresponding to specific count numbers and occurring in synchronism with the clock pulses on the clock bus are used to address selected loads. The loads, each, have a receiver section in which a counter is provided, stepping in synchronism with the counter of the central station. A decoding circuit, specific for each discrete load, decodes coincidence between the pulses on a control bus and the specific count number associated with the load and, upon coincidence of the count number by the counter, the number assigned to the load, and a pulse on the control bus, the load is addressed to carry out a predetermined switching function. Acknowledgment of the switching function is then transmitted coincident with the control pulse on the reply or acknowledgment bus.

Pilot installations have shown that systems of this kind have excellent operating characteristics and are suitable for commercial application.

These systems are particularly applicable to control the connection of selectively addressed loads in automotive vehicles. Traffic safety places high requirements on the reliability of such systems.

SUMMARY OF THE INVENTION

It is an object to improve remote control systems, particularly for automotive applications, to provide an operator perceptible sensing output if serious interference or malfunction occurs in the system which disables the operation thereof and which, still, does not expose a vehicle to unacceptable risks with respect to traffic safety.

Briefly, periodic occurrence of pulses in the bus system, and particularly periodic occurrence of clock pulses in the ring bus system are sensed by a pulse interrogation stage which has a control output to which signalling or alarm warning means are connected which, additionally, can automatically trigger the connection of warning lights or the like, or can cause other emergency functions or programs to become effective.

Failure of occurrence of periodic sequences of pulses or signals on the clock bus or clock line of the ring bus system is equivalent to failure of the central station of the system or of the bus connection itself, so that it is no longer possible to select operating functions of loads connected to the ring bus system. The signals applied to the ring bus system are divided into two separate types: (a) groups of pulses which occur in a sequence and which are used to time the selection and addressing of selected loads, occurring within selection cycles; and (b) control signals which separate sequential pulse groups forming the selection cycles and which may also be used to synchronize the operation of counters in respective loads with a counter, or counters in the central station. Lack of clock pulses on the clock bus prevents selection of certain loads during the occurrence of a selection cycle. In accordance with a feature of the present invention, failure of clock pulses on a clock bus causes, automatically, immediately the connection of signalling and/or alarm and warning apparatus or devices. In a motor vehicle, for example, this may include the connection of parking lights, warning flashers, or the like, so that vehicles which may have been completely disabled will be visible to other highway users to indicate that a traffic hazard exists due to presence of a disabled vehicle.

The interrogation stage can be associated directly with the central station; preferably, however, a plurality of interrogation stages are connected to various locations in the ring bus so that a warning function can be triggered in case a portion of the bus system only should have failed. In a preferred form, interrogation stages are associated with those receivers which have signalling and warning functions themselves. They are, usually, spacially distributed in the vehicle and connected at widely different points to the ring bus system. Such connections also permit elimination of special wiring from the control output of the interrogation stage to the respectively associated warning or signalling-type loads which provide the warning signals. Preferably, the respective receivers or loads have an OR-gate connected thereto which can be enabled by addressing this specific load—as set forth in the above referred-to U.S. application Ser. No. 648,783, now Pat. No. 4,085,403, or, in case of malfunction, from the output of the interrogation stage which is integrated with the specific load, or the load receiver.

In a preferred form, the present invention utilizes the concept described in co-pending, cross-referenced application Ser. No. 853,180, filed Sept. 20, 1977, Weckenmann and Haubner. Briefly, this application discloses a system in which the control signal which separates sequential selection cycles is formed by function synchronization pulses applied to the control or addressing bus of the bus system. Normally, the control or addressing bus carries only those pulses which are used to address selected receivers or selected loads. These function synchronization pulses are then additionally applied to the control bus, but at different times, and occurring during pauses of pulses on a clock line, which pauses on a clock line form a portion of the control signal. Thus, to provide synchronization of pulses sent from the central station and of counters in the receiver, the clock bus carries clock pulses but only during a selection cycle. To address a specific load, the control bus carries an additional addressing pulse during the selection cycle. The control signal then is formed by a pause of pulses, or a pulse gap on the clock bus but transmission of pulses on the control bus. This system permits overall supervision and monitoring of orderly operation of the remote control system, in accordance with a feature of the present invention, by continuously sensing the occurrence of pulses on the clock bus as well as on the control bus by interrogating both buses and sensing for constant presence of pulses on either one or the other, since pulses will occur on the control bus—forming the function synchronization signal—during the pulse gap on the clock bus, which separates the pulses of sequential selection cycles. The interrogation stage then requires no pre-programmed decoding stages or systems to recognize a particular pattern of pulses on respective buses; it is only necessary to sense orderly occurrence of clock pulses on the clock bus. The interrogation stage then can be a simple integrator with a discharge resistor and a negating output. The output provides a signal if, due to an interruption in the sequence of the pulses occuring the selection cycles and the pulses forming the function synchronization signals during the pulse gaps between selection cycles cause discharge of the integrating circuit. Any extensive interruption in the pulse sequence is thus sensed. Such a circuit can be constructed particularly simply by forming the interrogation stage as an R/C integrating circuit with a discharge resistor in which each discharge resistor is connected to one of two inputs of a NAND-gate.

DESCRIPTION OF THE PREFERRED EMBODIMENT

Figure 1:
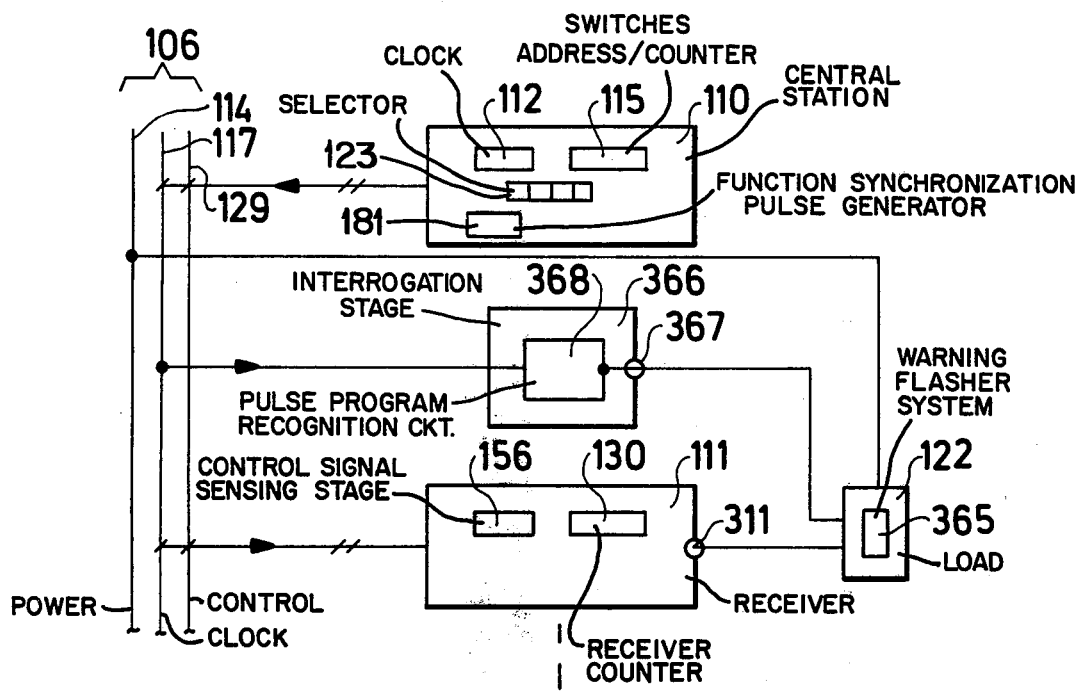
FIG. 1 is a highly schematic circuit diagram of a remote control system, adapted for connection to a plurality of loads, and having an interrogation stage connected to the central station.

The ring bus 106 (FIGS. 1, 2) has a power bus or line 114, a clock bus or line 117 and a control bus or line 129. In actual practice, a reply bus would also be used, as explained in U.S. Pat. No. 4,085,403. It is not shown since the reply bus is not necessary for an understanding of the present application.

The same reference numerals and element designations have been used in the present application as in the aforementioned U.S. Pat. No. 4,085,403, and features, elements, and their functions described therein will not be explained again.

A plurality of receivers 111 is connected to the ring bus system 106. The receivers 111 can be centrally addressed from the central station 110 by applying, as selected by selector switches 123, which may be automatically or manually operated, control pulses on the control bus 129 synchronously with clock pulses applied to clock bus 117 during a pulse sequence forming a selection cycle. The clock pulses are derived from a continuously running clock 112 which is connected to an address counter 115. Discrete count states of the counter are associated with discrete receivers 111, to which discrete loads 122 are connected. Each receiver includes a control signal sensing stage 156 and a receiver counter 130. The control signal sensing stage senses the beginning of pulses forming a selection cycle and causes the receiver counter 130 to count in synchronism with the clock pulses occurring on clock bus 117 which are transmitted thereto from clock 112 at the central station, so that the receiver counter 130 will count in synchronism with the counting of the address counter 115 in the central station. When the receiver counter 130 has reached that number which is associated with the respective receiver and, at the same time, a selection or control pulse is applied to the control bus 129, as commanded by the selector switches 123, the receiver output 311 will have a signal appear thereat which controls the associated load 122. The load 122 may, for example, be a light, such as the head-lights of a motor vehicle, or, for example, the parking lights of a motor vehicle, or may be the warning flasher system. The present invention is particularly applicable to loads which, inherently, have a warning function. Thus, load 365 as shown in FIG. 1 represents, schematically, the warning flasher system of a vehicle.

In accordance with the present invention, an interrogation stage 366 is connected to the ring bus system 106, and specifically to the clock bus 117. The interrogation stage has a control output 367 which is likewise connected to the load 122 and, specifically, to the warning flasher system. The interrogation stage senses absence of clock pulses, that is, the failure of pulses to occur in the sequence which it should have upon orderly operation of the clock 112, and of the address counter 115 in the central station 110. Unless the clock pulses derived from clock 112 and as counted by the address counter 115 are properly connected to the clock bus 117, addressing of specific loads 111 from the central station 110 is no longer possible. For example, a motor vehicle in which such a ring bus system is used cannot be reliably controlled anymore. This failure of control function within the motor vehicle may lead to degradation of its operating safety and also to orderly operation of the vehicle in traffic. Failure to enable proper operation of the vehicle is thus indicated to other users of the roadway within the traffic pattern by response of the warning flasher system 365.

The interrogation stage 366 includes a programmed pulse pattern recognition circuit 368 which provides an output signal to the control output 367 if the pattern of clock pulses on the clock bus 117 does not correspond to the pulses during any one selection cycle applied to the bus 117, that is, to the program of pulses on bus 117. A recognition circuit which recognizes a certain program of pulses, for example a sequence of pulses followed by a pause, is comparatively complex; it may include, for example, a counter similar to the address counter 115 which must count to its final count state to be then reset, or, otherwise provide an output signal if the counter does not reach the final count within a predetermined time interval.

In accordance with a preferred feature of the invention, the complex and rather expensive pulse program recognition circuit 366 can be avoided if a continuous sequence of pulses can be sensed, that is, pulses which occur in the pulse gaps between sequences of pulses on the bus 117. Such pulses which continue the sequence of the pulses of an interrogation cycle can be applied to the control bus 129. Thus, the expensive and complex pattern recognition circuit 368 need not be used; it is only necessary to connect both the clock bus 117 on which sequential pulses occur during an interrogation cycle with a subsequent gap, and the control bus on which function synchronization pulses occur during the gap of pulses on the clock bus to an interrogation stage 366' (FIG. 2).

Pulse recognition stage 366' includes an integrating circuit 369 and a discharge resistor 370. One of the pulse recognition stages 366' is connected to the clock bus 117, and another to the control bus 129. The outputs from the two interrogation stages 366' are connected to the inputs of a NAND-gate 371.

Figure 2:
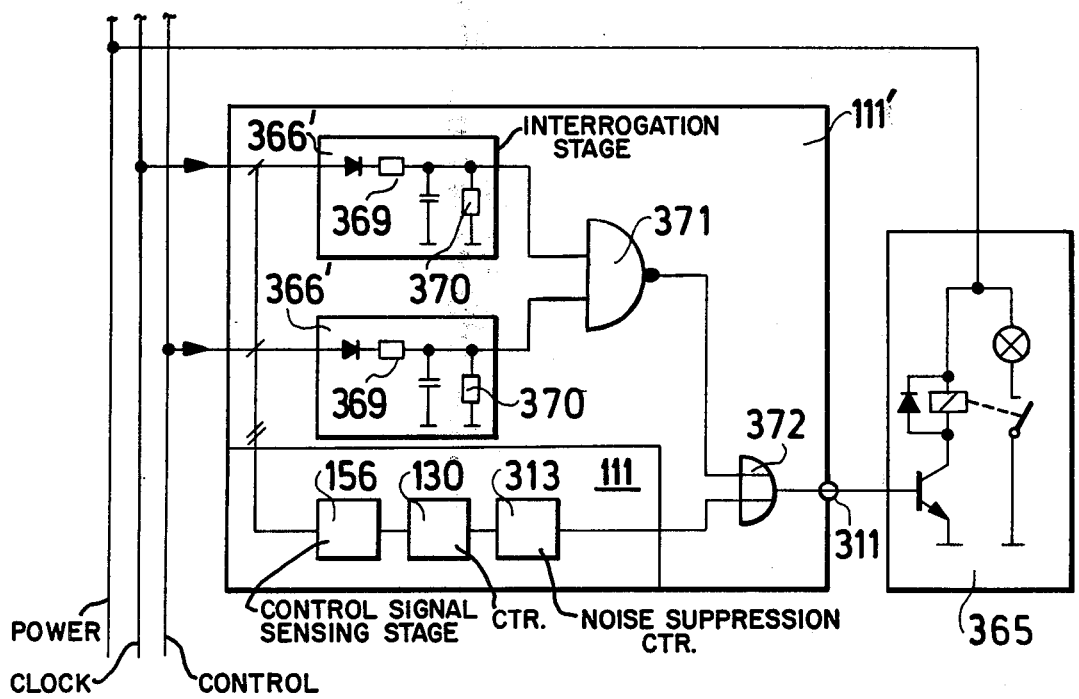
FIG. 2 is a schematic diagram of a receiver connected to the bus system with an integrating interrogation stage, sensing both clock pulses as well as function synchronization pulses.

The interrogation stages 366' preferably are integrated with the respective receiver 111 which provides the warning function (FIG. 2). The receiver, preferably, includes a noise pulse suppression counter 313, connected to the output of the receiver counter 130 and recognizing count stages which would not be permitted by the specific receiver, so as to reject stray noise pulses which might be introduced into the bus system 106. Operation of such a noise suppression counter is described in co-pending application Ser. No. 836,979, filed Sept. 26, 1977, Weckenmann et al. The outputs of the receiver counter 130, through the noise suppression counter 313 and of the NAND-gate 371 are then connected through an OR-gate 372 to the output from receiver 111 and to the warning flasher circuit 365.

Operation: If the central station 110 provides sequential clock pulses on clock bus 117, the upper one of the interrogation stages 366' (FIG. 2) and connected to the clock bus 117 will provide an output signal to the gate 371. During the gap between pulses on the clock bus 117, the integrating circuit 369 will discharge through discharge resistor 370 and the signal will disappear. A signal will be available, however, from the lower one of the interrogation stages 366' (FIG. 2) and be applied to gate 371. If neither of the stages 366' have an output, however, the NAND-gate 371 will have an output signal, thereby controlling the warning flasher system 365 to provide a warning blinker signal. The system 365 may be any one suitable warning device which, particularly in a motor vehicle, may be the low beam and tail light system, parking light system, or other warning devices.

In a preferred form, each one of the receivers 111 which are associated with warning devices in the motor vehicle, that is, typically low beam lights, tail lights, flasher systems, and the like, should have the respective receivers fitted with interrogation stages 366' and the NAND-gate 371 as shown in FIG. 2. This permits supervision of the bus system 106 at numerous spacially distributed locations within the vehicle and eliminates special wiring from the control output 367 (FIG. 1) to signalling or warning devices 365 since the output of the interrogation stage is then connected, in any event, directly to the warning system 365 through merely an isolation or buffer element, formed by OR-gate 372. The second input of OR-gate 372 can then be controlled as described in any one of the aforementioned applications or patent. The function synchronization pulse generator 181 and the pulse distribution are described, specifically, in co-pending application Ser. No. 855,180, filed Sept. 20, 1977, Weckenmann and Haubner.

Various changes and modifications may be made within the scope of the inventive concept. For example, and in a preferred form, receiver 111 and its associated interrogation and logic elements are associated into a single unit 111'.

We claim:

1. Remote control system for selection of at least one of a plurality of selectrively switchable loads (122) from a central station (110) connected together by a bus system (106),
wherein the bus system includes a power bus (114), a clock bus (117), and a control bus (129);
wherein said central station (110) includes
a clock source (112),
timing means (115, 181) selecting a first time interval corresponding to a predetermined number of clock pulses to define a selection cycle of clock pulses, and a second time interval to define a control signal separating sequential selection cycles, the timing means (115, 181) being connected to said bus system (106) and and include means to, selectively and successively, connect
(a) the clock pulses to the clock bus (117) during said first time interval forming the selection cycle and
(b) the clock pulses to the control bus (129) during pulse gaps or pauses of clock pulses on a clock bus (117) and defining the control signal, and forming function synchronization pulses;
and wherein each load (122) includes
a receiver (111) connected to said bus system (106) and responsive to clock pulses, the control signal, and address control pulses on the bus system to cause an operating function to occur at a specifically addressed receiver,
said system comprising, in accordance with the invention,
a pulse interrogation stage (366, 366') connected to the clock bus (117) and to the control bus (129 of the bus system (106) and responsive to pulses on the respective buses of the bus system, and sensing continuing recurrence of pulses on said bus system;
and alarm warning means (365) connected to and controlled by said pulse interrogation stage to provide an output signal upon failure of detection of pulses on either one of the buses of said bus system (106).

2. System according to claim 1, for use in the control of loads in an automotive vehicle, wherein the alarm warning means (365) comprise warning light means.

3. System according to claim 2, wherein the warning light means have a pulse interrogation stage associated therewith;
and an OR function gate (372) connected to the input of said warning light means and controlled, selectively, by the receiver (111) of the load or by the interrogation stage (366, 366').

4. System according to claim 3, wherein the receiver (111) and the interrogation stage (366') are included in a single receiver unit (111').

5. System according to claim 1, wherein the interrogation stage includes an interrogation circuit (366') connected to said clock bus and a second interrogation circuit (366') connected to said control bus (129) and combining means (371) combining the outputs from said interrogation circuits and providing an output if neither one of said circuits senses the occurrence of pulses on the respectively connected bus.

6. System according to claim 5, wherein the interrogation circuits comprise integrating circuits.

7. System according to claim 6, wherein at least one of integrating circuits has an inverted output.

8. System according to claim 5, wherein said interrogation circuits are similar.

9. System according to claim 5, wherein said combining means comprises a NAND-gate (371).

10. System according to claim 5, wherein at least one of said interrogation circuits comprises an integrating circuit having a discharge resistor, the time constant of said integrating circuit being just slightly longer than the full cycle time of one pulse—pulse gap cycle of clock pulses derived from said clock source (112).

* * * * *